US007040176B2

(12) United States Patent
Anzai et al.

(10) Patent No.: US 7,040,176 B2
(45) Date of Patent: May 9, 2006

(54) DESIGN ANALYSIS METHOD OF EARTHQUAKE-PROOF REINFORCEMENT STRUCTURE, AND STORAGE MEDIUM

(75) Inventors: Hajime Anzai, Niigata (JP); Takashi Tachikawa, Niigata (JP); Keijiro Yoshida, Tokyo (JP); Hiroshi Sudo, Tokyo (JP); Tomomichi Nakamura, Hyogo-ken (JP); Shigeru Ochiai, Tokyo (JP)

(73) Assignees: Nihonkai Lng Co., Ltd, Niigata (JP); Mitsubishi Heavy Industries, Ltd., Tokyo (JP); Jonquil Consulting Inc., Tokyo (JP)

( * ) Notice: Subject to any disclaimer, the term of this patent is extended or adjusted under 35 U.S.C. 154(b) by 740 days.

(21) Appl. No.: 10/007,969

(22) Filed: Dec. 6, 2001

(65) Prior Publication Data

US 2002/0095275 A1 Jul. 18, 2002

(30) Foreign Application Priority Data

Dec. 25, 2000 (JP) .................................... 2000-393357

(51) Int. Cl.
*G01N 3/00* (2006.01)
*G06F 19/00* (2006.01)

(52) U.S. Cl. ............................................. 73/760; 702/1
(58) Field of Classification Search .............. 703/2, 703/6, 8, 1; 73/760

See application file for complete search history.

(56) References Cited

U.S. PATENT DOCUMENTS

| 4,964,060 | A | | 10/1990 | Hartsog |
| 5,533,307 | A | * | 7/1996 | Tsai et al. .................. 52/167.3 |
| 6,237,303 | B1 | * | 5/2001 | Allen et al. ................. 52/729.1 |
| 6,397,153 | B1 | * | 5/2002 | Yamagishi et al. ........... 702/42 |
| 6,425,157 | B1 | * | 7/2002 | Ouchi et al. .................... 703/1 |

FOREIGN PATENT DOCUMENTS

| EP | 1 108 831 | 6/2001 |
| JP | 10-142112 | 5/1998 |
| JP | 2000-322467 | 11/2000 |

* cited by examiner

*Primary Examiner*—Max Noori
*Assistant Examiner*—Lilybett Martir
(74) *Attorney, Agent, or Firm*—Merchant & Gould P.C.

(57) ABSTRACT

A member of an earthquake-proof reinforcement structure is selected with reference to the allowable stress intensity ratio of the member, a ductility factor ratio allowable as a deformation magnification by earthquake-proof reinforcement of the selected member is set, an increase in load in a plasticity range, which acts on the selected member, is calculated on the basis of the set ductility factor ratio, and a corresponding allowable stress intensity ratio is obtained. When the obtained allowable stress intensity ratio is defined as a maximum value of 1.0, the corresponding increase in load in the plasticity range is specified as an ultimate load at which the selected member collapses.

14 Claims, 16 Drawing Sheets

LOAD-DISPLACEMENT CURVE
(WITHOUT EARTHQUAKE-PROOF REINFORCEMENT)

LOAD-DISPLACEMENT CURVE
(WITH EARTHQUAKE-PROOF REINFORCEMENT)

FIG. 9

COMPARISON OF YIELD DISPLACEMENT, MAXIMUM DISPLACEMENT, AND DUCTILITY FACTOR

| MODEL | YIELD DISPLACEMENT Xy(mm) | MAXIMUM DISPLACEMENT Xu(mm) | DUCTILITY FACTOR $\mu$ |
|---|---|---|---|
| WITHOUT EARTHQUAKE-PROOF REINFORCEMENT | 1.38 | 6.12 | 4.4 |
| WITH EARTHQUAKE-PROOF REINFORCEMENT | 10.36 | 142 | 13.7 |

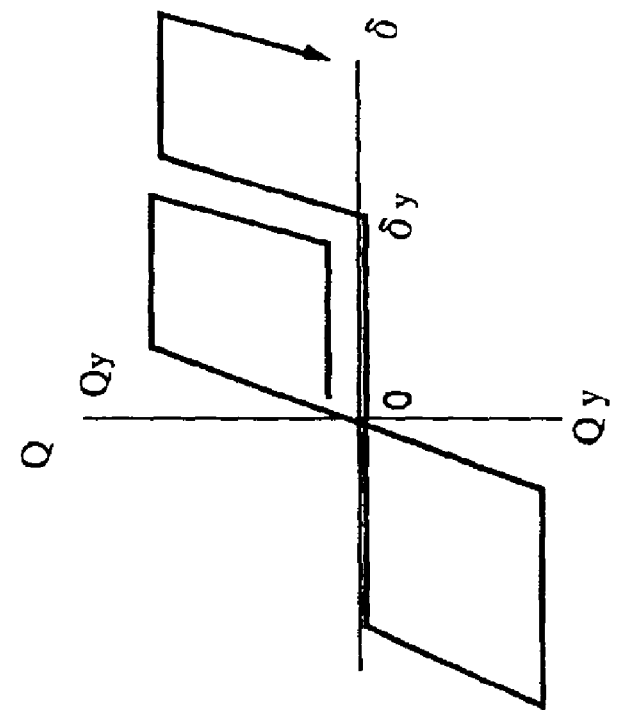
FIG. 12A  COMPLETELY ELASTO-PLASTIC TYPE
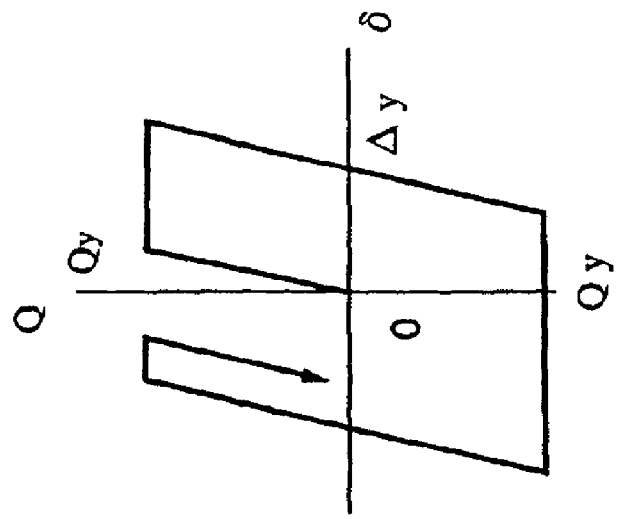
FIG. 12B  SLIP TYPE

HORIZONTAL LOAD P AND HORIZONTAL DISPLACEMENT δ

$P_E$ HORIZONTAL FORCE
$P_y$ YIELD HORIZONTAL LOAD
$δ_P$ ELASTIC-PLASTIC HORIZONTAL DISPLACEMENT
$δ_E$ ELASTIC HORIZONTAL DISPLACEMENT
$δ_y$ YIELD HORIZONTAL DISPLACEMENT

RESTORING FORCE CHARACTERISTIC OF STRUCTURE

C-14 PIPE RACK  (HORIZONTAL SEISMIC INTENSITY IN EARTHQUAKE K = 0.3)

| CODE | MEMBER | F | | lb (cm) | C | lb (cm) | | LONG TERM (tm.t) | EARTHQUAKE (tm.t) | SHORT TERM (tm.t) | LONG TERM $\sigma/f$ | SHORT TERM $\sigma/f$ |
|---|---|---|---|---|---|---|---|---|---|---|---|---|
| X3G1 ⊥ | H-400*200*8*13 Z=1190.0 Aw=32.0 | 2.4 | L | 335 | 1.00 | 1.60 | ML | 8.87 | 9.14 | 18.01 | .47 | .63 |
| | | | C | 330 | 1.00 | 1.60 | MC | 6.78 | | 6.78 | .36 | .24 |
| | | | R | 335 | 1.00 | 1.60 | MR | 8.12 | 9.14 | 17.26 | .43 | .61 |
| | | | | | | 0.92 | QL | 8.36 | 1.83 | 10.19 | .33 | .27 |
| | | | | | | 0.92 | QR | 6.02 | 1.83 | 7.85 | .24 | .21 |
| X3G2 ⊥ | H-346*174*6*9 Z=641.0 Aw=20.76 | 2.4 | L | 335 | 1.00 | 1.35 | ML | 6.69 | .39 | 7.08 | .78 | .55 |
| | | | C | 330 | 1.00 | 1.36 | MC | 4.32 | | 4.32 | .50 | .33 |
| | | | R | 335 | 1.00 | 1.35 | MR | 6.53 | .39 | 6.92 | .76 | .54 |
| | | | | | | 0.92 | QL | 4.39 | .32 | 4.71 | .27 | .19 |
| | | | | | | 0.92 | QR | 4.35 | .32 | 4.67 | .27 | .19 |
| Y3G1 ⊥ | H-350*175*7*11 Z=775.0 Aw=24.5 | 2.4 | L | 300 | 1.00 | 1.60 | ML | 5.17 | 2.01 | 7.18 | .42 | .39 |
| | | | C | 400 | 1.00 | 1.26 | MC | 3.53 | | 3.53 | .37 | .24 |
| | | | R | 200 | 1.00 | 1.60 | MR | 8.93 | 1.51 | 10.44 | .72 | .57 |
| | | | | | | 0.92 | QL | 2.90 | .41 | 3.31 | .15 | .11 |
| | | | | | | 0.92 | QR | 5.81 | .33 | 6.14 | .30 | .21 |
| X2G1 ⊥ | H-250*250*9*14 Z=867.0 Aw=22.5 | 2.4 | L | 335 | 1.00 | 1.60 | ML | 2.10 | 11.04 | 13.14 | .16 | .64 |
| | | | C | 330 | 1.00 | 1.60 | MC | 1.76 | | 1.76 | .13 | .09 |
| | | | R | 335 | 1.00 | 1.60 | MR | 2.07 | 11.04 | 13.11 | .15 | .63 |
| | | | | | | 0.92 | QL | 1.79 | 6.97 | 8.76 | .10 | .33 |
| | | | | | | 0.92 | QR | 1.57 | 6.97 | 8.54 | .09 | .32 |

NOTE: SYMBOLS IN TABLE ARE  
M – BENDING MOMENT  
Q – SHEARING FORCE  
lb – BUCKLING LENGTH  
fb – ALLOWABLE BENDING STRESS  
fs – ALLOWABLE SHEARING STRESS

FIG. 15

DESIGN ANALYSIS METHOD OF EARTHQUAKE-PROOF REINFORCEMENT STRUCTURE, AND STORAGE MEDIUM

FIELD OF THE INVENTION

The present invention relates to a design analysis method of an earthquake-proof reinforcement structure for a pipe rack which supports an energy transport pipe used in a plant such as a natural gas (LNG) stock facility, and a storage medium which stores a program module for causing a computer to execute the analysis.

BACKGROUND OF THE INVENTION

Mankind has suffered heavily from earthquakes. Even in last several years, the Great Hanshin-Awaji Earthquake (Japan), Izmit Earthquake (Turk), Chichi Earthquake (Taiwan), and the like damaged utility life lines. Especially, in the Great Hanshin-Awaji Earthquake, three days were required to recover power and several months for city gas. This made people realize that comprehensive examination was necessary for the safety of utilities. Recently, taking advantage of lessons given by, e.g., the destruction of highways in the Great Hanshin-Awaji Earthquake, various earthquake-proof reinforcement methods have been examined to improve the strengths of constructions in case of an earthquake, including existing buildings and structures built under the old earthquake-proof design standard, assuming a greater earthquake.

For example, as earthquake-proof reinforcement methods for existing steel framed reinforced concrete structures, a method of winding a reinforcing bar and additionally placing concrete to improve the strength of a column member, a design method of winding a steel plate to reinforce a column member, and the like have been proposed.

However, in conventional design techniques applied to a pipe rack and the like, members such as beams, columns, or braces are selected without taking an ultimate load (true strength) until the pipe rack finally breaks into consideration. That is, for the relationship between a structure and an external force that the structure should withstand, a member with or without a sufficient strength may be selected, and no quantitative evaluation is reflected at the stage of design.

As a problem in the conventional earthquake-proof reinforcement method for a rack structure, when a steel column base and foundation are rigidly connected by jointing a reinforcing fitment to the joint portion between the column and a beam at the lower end of the steel column or applying reinforced concrete with pedestal foundation, the column base support method by the foundation changes from pin support to a fixed condition, and a shearing force or bending moment is transmitted to the foundation through the new interface between the column base and the reinforcing fitment or reinforced concrete. The shearing force or bending moment transmitted to the foundation increases with increasing magnitude of a seismic force. Hence, if the steel column base and the foundation are rigidly connected, the foundation itself cannot withstand a force more than allowable stress intensity and may break.

Conventional strength design for a foundation ensures a sufficient safety factor against an axial force (a load that acts in the axial direction of a member), though the safety factor against a bending moment has no sufficient margin as compared to that for an axial force. Hence, when the allowable stress of a foundation has some margin, the earthquake-proof reinforcement method of applying a cover plate to a column or beam can be preferably used. However, when the allowable stress of a foundation is designed with little margin, the method of simply reinforcing a column or beam using a cover plate is not preferable.

In the conventional pipe rack design, members such as beams, columns, or braces are selected without taking an ultimate load (true strength) until the pipe rack finally breaks into consideration. That is, for the relationship between a rack structure and a load that the structure should withstand, members having a sufficient strength and members without any sufficient strength may be consequently selected and mixed, and quantitative evaluation for load condition and member selection in consideration of situations until the entire pipe rack collapses is not reflected at the stage of design.

In addition, it is very important for structure design to quantitatively estimate the ultimate load of a pipe rack whose earthquake-proof performance is improved by extending the elastic region and plastic deformation region by earthquake-proof reinforcement. However, it is difficult to quantitatively evaluate this factor, and this evaluation has been done based on designer's experience.

SUMMARY OF THE INVENTION

In the present invention, as an earthquake-proof reinforcement method, in reinforcing the base of a column member standing on the foundation of a pipe rack by a concrete member with pedestal foundation, an earthquake-proof reinforcement structure using concrete with pedestal foundation for a column member is applied to the pipe rack, in which a damper portion is provided between the column base and the concrete member with pedestal foundation, and a bending moment generated in the base by an external force is reduced by the damper portion such that it is hardly transmitted to the foundation, thereby reducing the bending moment that the foundation member takes a share.

It is an object of the present invention to provide a design analysis method of evaluating, on the basis of a ductility factor ratio, the degree of a load that can be covered by a pipe rack having an earthquake-proof reinforcement structure using concrete with pedestal foundation, quantitatively obtaining the relationship between a load factor (seismic intensity) representing an increase in load and the allowable stress intensity ratio ($\sigma/f$) for each of the column, beam, and brace as the elements of the pipe rack, and specifying the ultimate load at which each element or the entire structure breaks from given design conditions, and a storage medium which stores a program module for causing a computer to execute the analysis.

In order to achieve the above object, a design analysis method of an earthquake-proof reinforcement structure and storage medium according to the present invention are mainly characterized by the following arrangements.

That is, a design analysis method of an earthquake-proof reinforcement structure, characterized by comprising:

the selection step of selecting a member of the earthquake-proof reinforcement structure with reference to an allowable stress intensity ratio of the member;

the ductility factor ratio setting step of setting a ductility factor ratio allowable as a deformation magnification by earthquake-proof reinforcement of the selected member;

the load factor calculation step of calculating an increase in load in a plasticity range, which acts on the selected member, on the basis of the set ductility factor ratio;

the calculation step of calculating an allowable stress intensity ratio corresponding to the increase in load in the plasticity range; and the specifying step of, when the calculated allowable stress intensity ratio is defined as a maximum value, specifying the corresponding increase in load in the plasticity range as an ultimate load at which the selected member collapses.

In the analysis method of the earthquake-proof reinforcement structure, the maximum value of the allowable stress intensity ratio is preferably 1.0.

In the analysis method of the earthquake-proof reinforcement structure, the ductility factor ratio in earthquake-proof reinforcement having a damper portion arranged between a base of a column member and a reinforcing member using concrete with pedestal foundation in the earthquake-proof reinforcement structure is preferably not less than 3.0.

In the analysis method of the earthquake-proof reinforcement structure, preferably, in the selection step, a load of an object supported by the earthquake-proof reinforcement structure is used as a condition for member selection.

In the analysis method of the earthquake-proof reinforcement structure, preferably, in the specifying step, for an earthquake-proof reinforcement structure formed from a plurality of types of members, ultimate loads specified for the respective members are compared, and a minimum ultimate load of the ultimate loads is specified as the ultimate load of the earthquake-proof reinforcement structure.

In the analysis method of the earthquake-proof reinforcement structure, preferably, in the specifying step, for an earthquake-proof reinforcement structure formed from a main member and a reinforcing member for reinforcing the main member, ultimate loads specified for the respective members are compared, and when the ultimate load of the main member is larger than that of the reinforcing member, the ultimate load of the main member is specified as the ultimate load of the earthquake-proof reinforcement structure.

In the analysis method of the earthquake-proof reinforcement structure, preferably, the main member comprises a beam or column member, and the reinforcing member comprises a brace member.

A storage medium which stores a program module for causing a computer to execute a design analysis method of an earthquake-proof reinforcement structure, comprising:

a selection module for selecting a member of the earthquake-proof reinforcement structure with reference to an allowable stress intensity ratio of the member;

a ductility factor ratio setting module for setting a ductility factor ratio allowable as a deformation magnification by earthquake-proof reinforcement of the selected member;

a load factor calculation module for calculating an increase in load in a plasticity range, which acts on the selected member, on the basis of the set ductility factor ratio;

a calculation module for calculating an allowable stress intensity ratio corresponding to the increase in load in the plasticity range; and a specifying step for, when the calculated allowable stress intensity ratio is defined as a maximum value, specifying the corresponding increase in load in the plasticity range as an ultimate load at which the selected member collapses.

In the storage medium, the maximum value of the allowable stress intensity ratio is preferably 1.0.

In the storage medium, the ductility factor ratio in earthquake-proof reinforcement having a damper portion arranged between a base of a column member and a reinforcing member using concrete with pedestal foundation in the earthquake-proof reinforcement structure is preferably not less than 3.

In the storage medium, preferably, in the selection module, selection processing of the member is executed using a load of an object supported by the earthquake-proof reinforcement structure as a condition for member selection.

In the storage medium, preferably, in the specifying module, for an earthquake-proof reinforcement structure formed from a plurality of types of members, ultimate loads specified for the respective members are compared, and a minimum ultimate load of the ultimate loads is specified as the ultimate load of the earthquake-proof reinforcement structure.

In the storage medium, preferably, in the specifying module, for an earthquake-proof reinforcement structure formed from a main member and a reinforcing member for reinforcing the main member, ultimate loads specified for the respective members are compared, and when the ultimate load of the main member is larger than that of the reinforcing member, the ultimate load of the main member is specified as the ultimate load of the earthquake-proof reinforcement structure.

A design analysis method of an earthquake-proof reinforcement structure, comprising the steps of:

designing selected members on the basis of an ultimate load specified by the above design analysis method; and designing earthquake-proof reinforcement by providing a damper portion between a base of a column member of the designed selected members and a reinforcing member using concrete with pedestal foundation, which reinforces the base.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a table showing the result of the static loading test, i.e., the comparison between the measurement results of the displacement (yield displacement $x_y$) until the rack structure yields and displacement (maximum displacement $x_u$) until the rack structure collapses and the ductility factor $\mu(=x_u/x_y)$;

FIG. 12A is a view showing completely elasto-plastic deformation in the restoring force characteristic of a frame structure;

FIG. 12B is a view showing slip deformation in the restoring force characteristic of a frame structure;

FIG. 15 is a table showing the contents of a member characteristic database.

DETAILED DESCRIPTION OF THE PREFERRED EMBODIMENT

Preferred embodiments of the present invention will now be described in detail in accordance with the accompanying drawings.

<Description of Earthquake-Proof Reinforcement Structure>

Figure 1A:
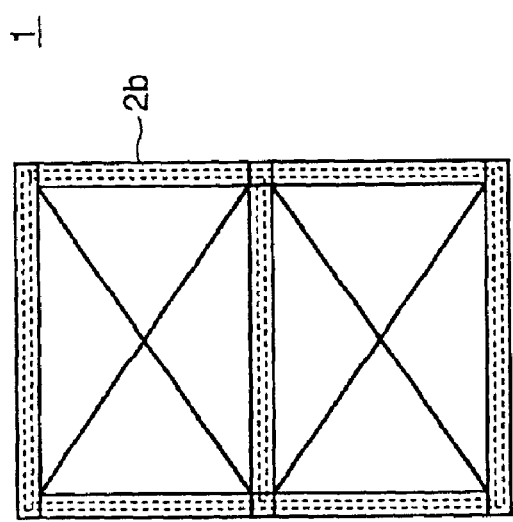
FIG. 1A is a plan view of the entire structure of a pipe rack formed from steel columns before reinforcement.
Figure 1C:
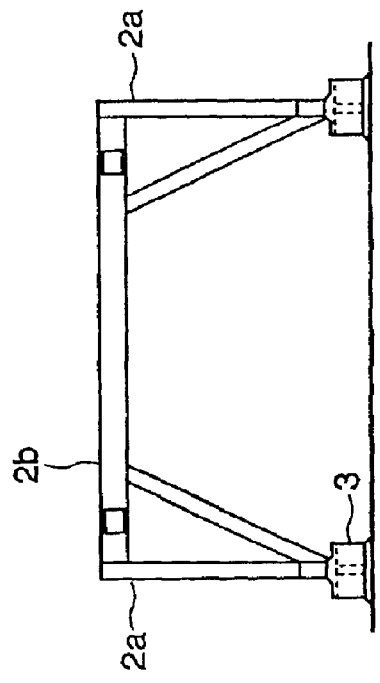
FIG. 1C is a side view of the entire structure of the pipe rack before reinforcement.
Figure 1B:
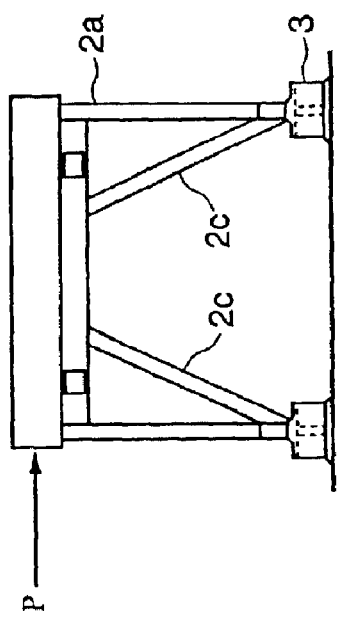
FIG. 1B is a front view of the entire structure of the pipe rack before reinforcement.

An earthquake-proof reinforcement method to be applied to a pipe rack will be described with reference to the accompanying drawings. FIGS. 1A to 1C are views showing the entire structure of a pipe rack 1 before reinforcement. FIG. 1A is a plan view of the pipe rack 1 formed from steel columns 2a (e.g., H steel), FIG. 1B is a front view of the pipe rack 1, and FIG. 1C is a side view of the pipe rack 1. Each steel column 2a stands on a foundation 3, as shown in FIGS. 1B and 1C. A beam 2b is fixed between two columns 2a, which are reinforced by brace members 2c.

Figure 2:
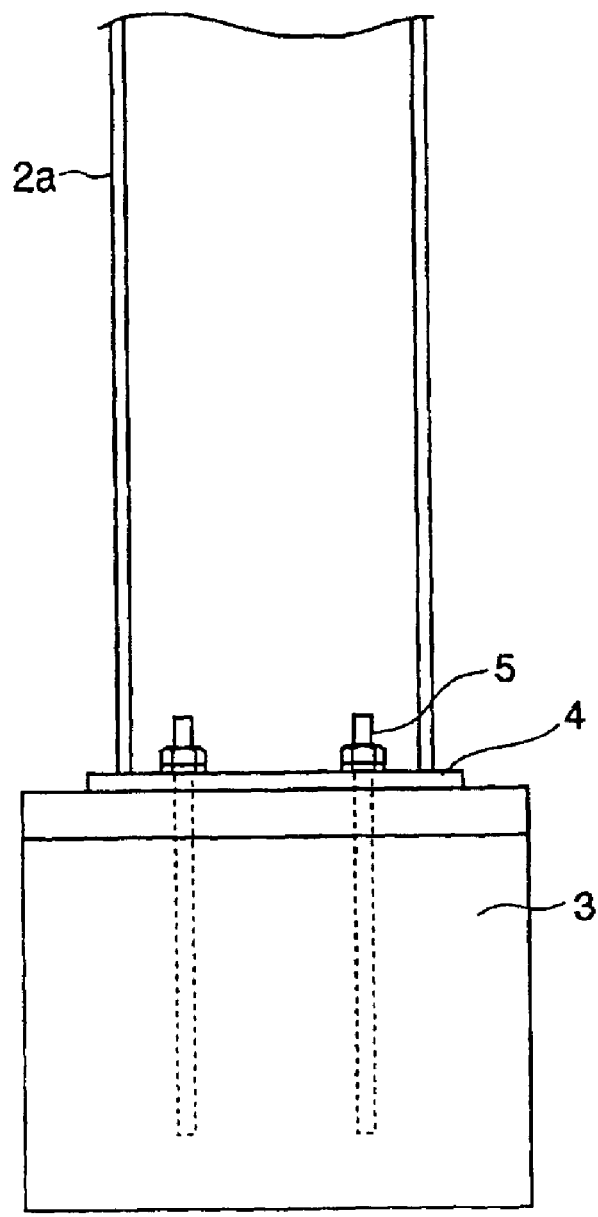
FIG. 2 is an enlarged view showing a lower-end side surface of an unreinforced column base of the pipe rack 1.
Figure 3:
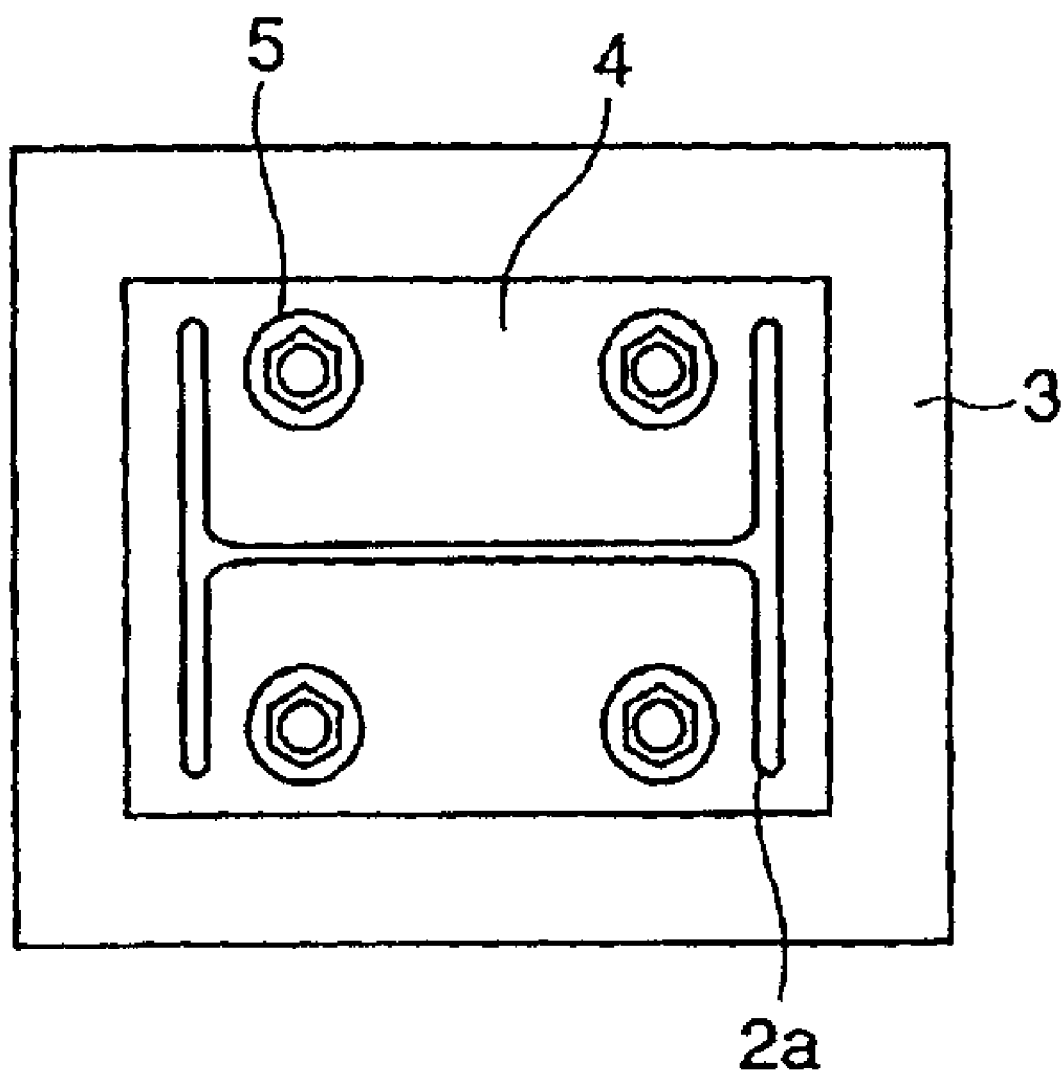
FIG. 3 is a view showing the attachment portion of the lower end of the column base shown in FIG. 2 when viewed from the direction of the arrow in FIG. 2.

FIG. 2 is an enlarged view showing a lower-end side surface of an unreinforced column base of the pipe rack 1. FIG. 3 is a view showing the attachment portion of the lower end of the column base shown in FIG. 2 when viewed from the direction of the arrow in FIG. 2. FIGS. 2 and 3 show a state wherein the unreinforced steel column 2a is welded to a base plate 4 and connected to the foundation 3 by anchor bolts 5.

Figure 4:
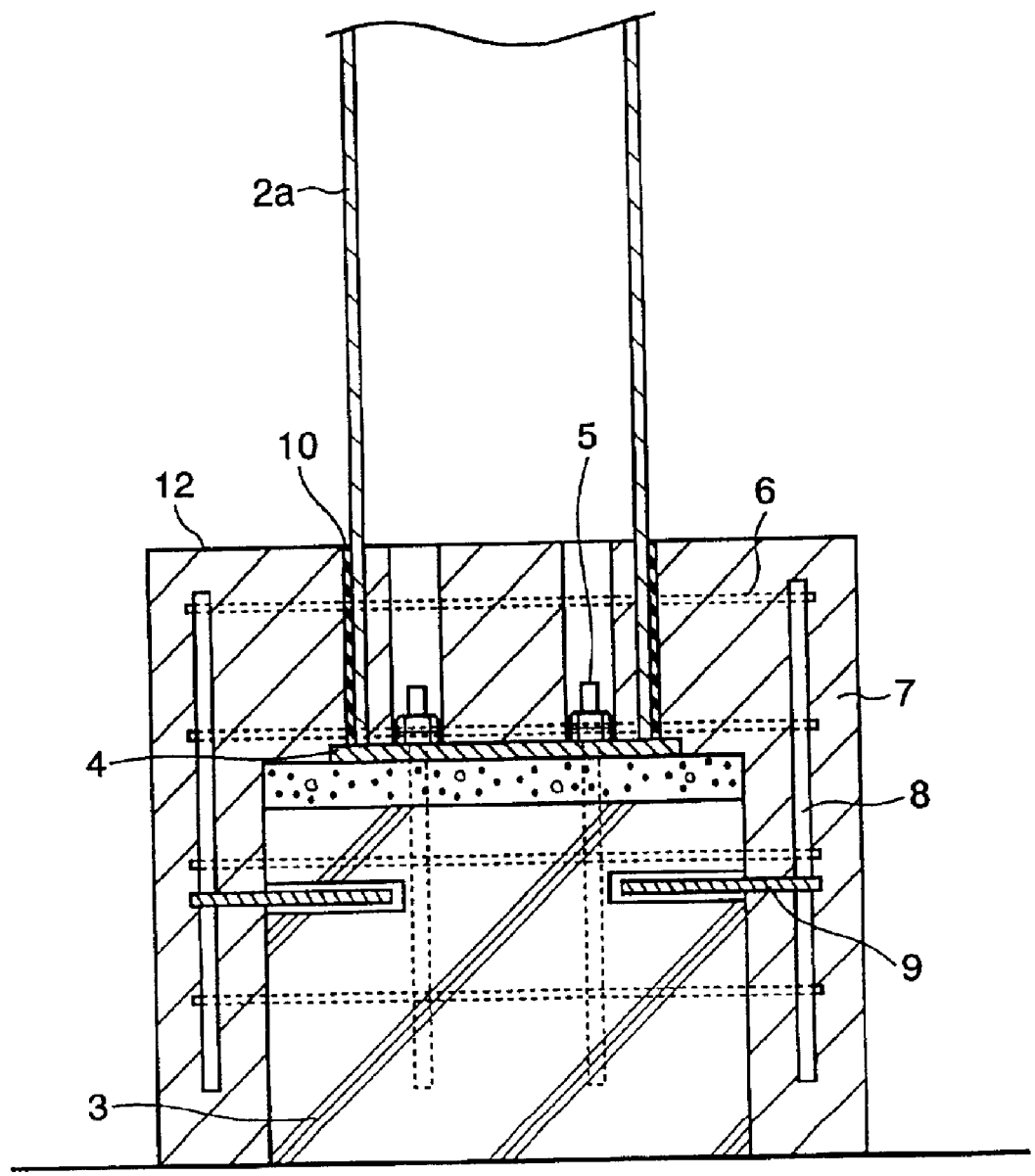
FIG. 4 is an enlarged view of the column base of the pipe rack 1, which is reinforced by a reinforcement structure using concrete with pedestal foundation.
Figure 5:
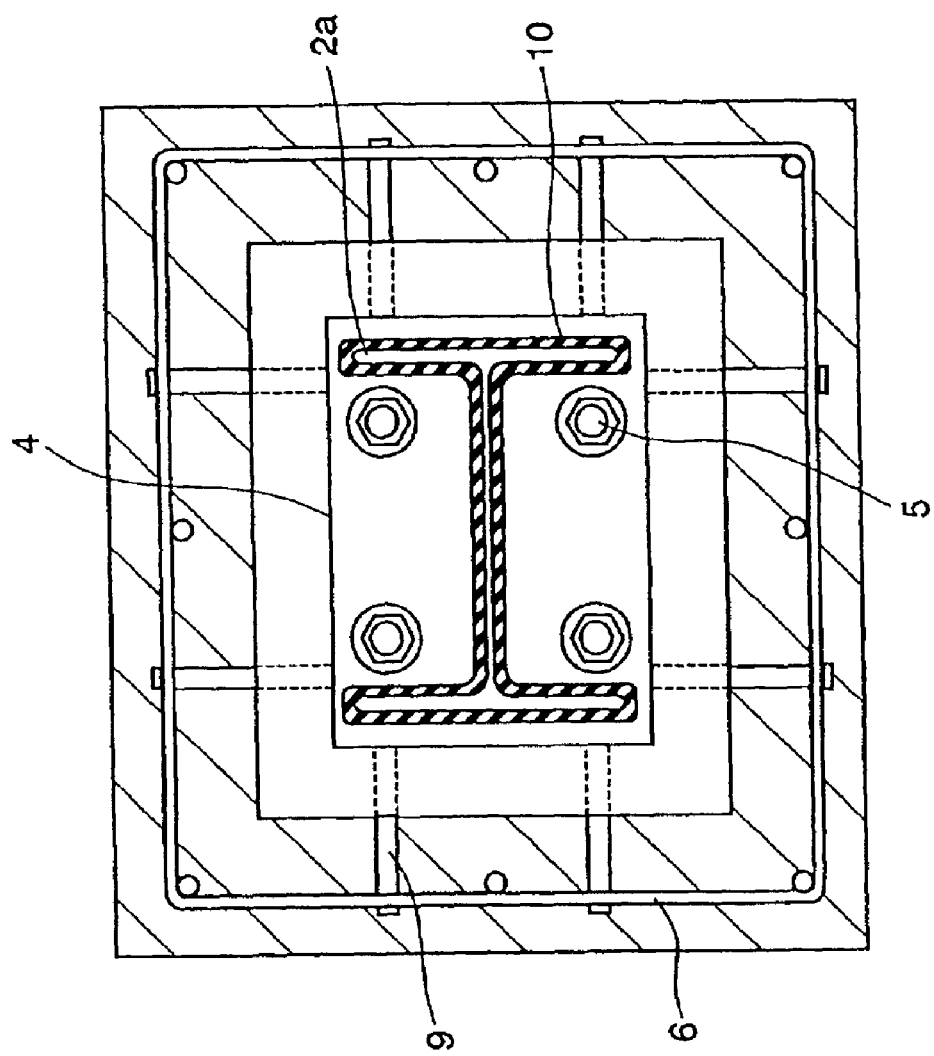
FIG. 5 is a sectional view of the column base of the pipe rack 1, which is reinforced by the reinforcement structure using concrete with pedestal foundation, when viewed from the direction of the arrow in FIG. 4.

FIG. 4 is an enlarged view of the column base of the pipe rack 1, which is reinforced by a reinforcement structure using concrete with pedestal foundation. FIG. 5 is a sectional view of the column base of the pipe rack 1, which is reinforced by the reinforcement structure using concrete with pedestal foundation, when viewed from the direction of the arrow in FIG. 4. A procedure of forming the earthquake-proof reinforcement structure (concrete portion 12 with pedestal foundation) on the foundation of the pipe rack will be described below with reference to FIG. 4.

The concrete portion 12 with pedestal foundation is formed by placing anchor bolts 9 for fixing the concrete portion 12 with pedestal foundation to the foundation 3, and tops 8 of reinforcement and hoop iron rod 6 arranged around the foundation 3, then arranging a form for forming a predetermined gap 10 around the steel column 2a, and finally pouring concrete. Next, the form buried around the steel column 2a is removed to form the gap 10 around the steel column 2a. The thus obtained gap 10 is filled with a predetermined selected filler (e.g., vibration isolating rubber), thereby forming a reinforcement structure using concrete with pedestal foundation.

<Pipe Rack Reinforced by Earthquake-Proof Reinforcement Structure>

<Evaluation of Earthquake-Proof Performance>

To verify the reinforcement effect of the pipe rack 1 having the earthquake-proof reinforcement structure using concrete with pedestal foundation, a static loading test was conducted by applying a static load to a rack having no earthquake-proof reinforcement structure (to be referred to as "model A" hereinafter) and a rack having an earthquake-proof reinforcement structure (to be referred to as "model B" hereinafter) to grasp the strength (ultimate strength) beyond the yield point of members such as a beam, brace, and column.

This test will be described with reference to FIGS. 6 and 7.

Figure 6:
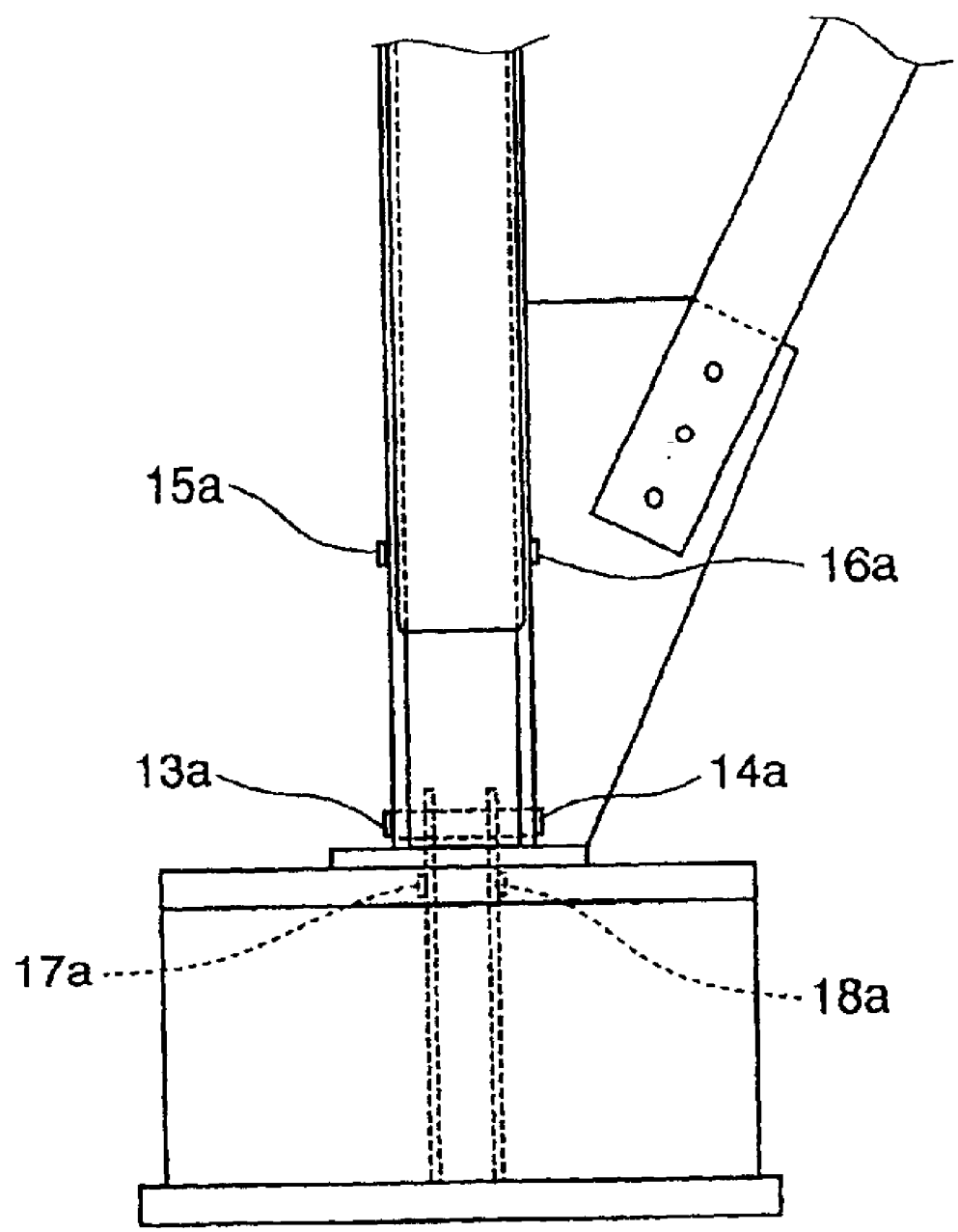
FIG. 6 is a view showing the set positions of wire strain gauges 13a to 18a set at the column base of the pipe rack 1 used for an earthquake-proof test before reinforcement.
Figure 7:
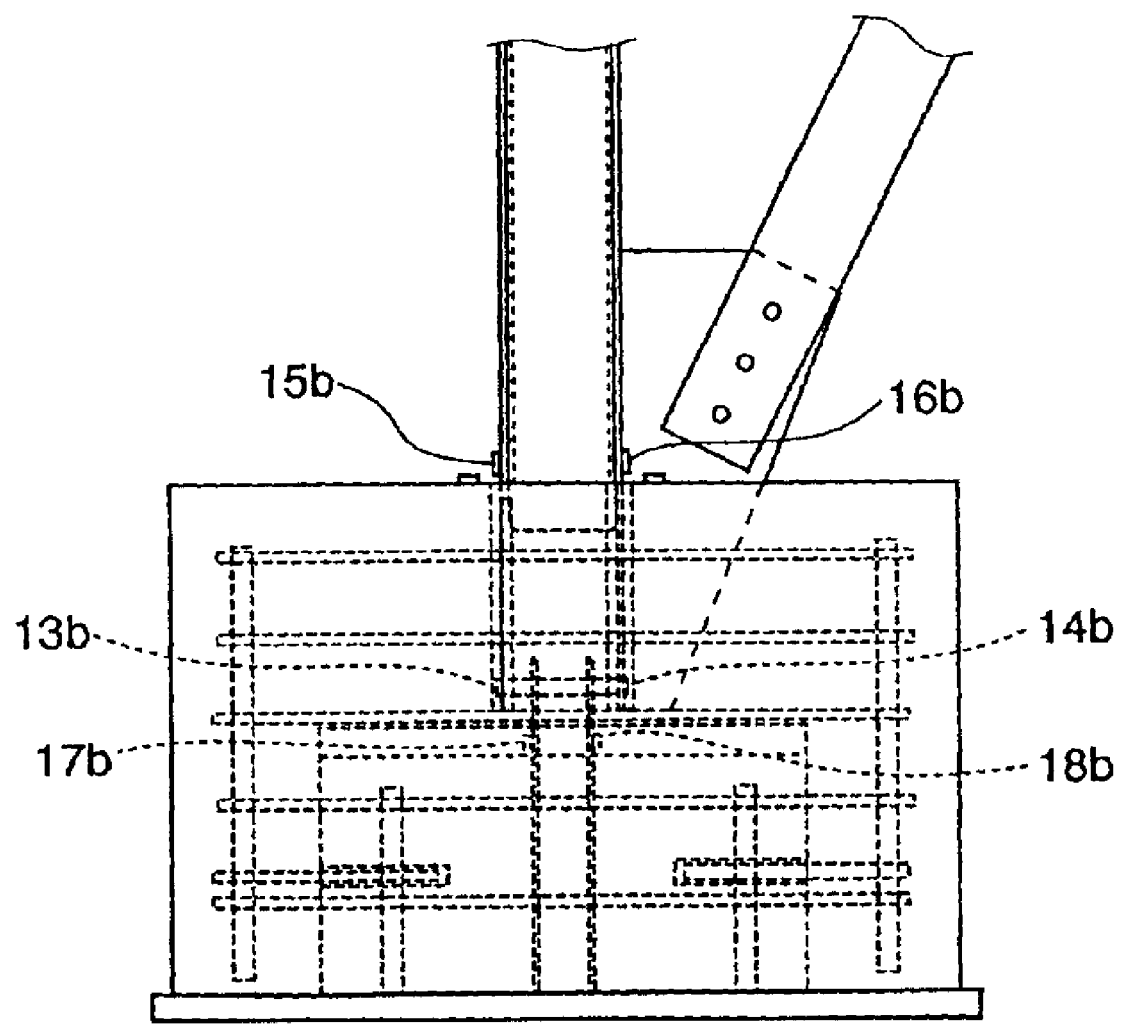
FIG. 7 is a view showing the set positions of wire strain gauges 13b to 18b set at the column base of the pipe rack 1 used for an earthquake-proof test after reinforcement.

FIG. 6 is a view showing the set positions of wire strain gauges 13a to 18a set at the column base of the pipe rack 1 used for the earthquake-proof test before reinforcement. FIG. 7 is a view showing the set positions of wire strain gauges 13b to 18b set at the column base of the pipe rack 1 used for an earthquake-proof test after reinforcement. A static load P is horizontally applied to the beams of model A, as shown in FIG. 1B, and a displacement generated when the load P is gradually increased is measured by the strain gauges. The load P is also applied to the same position of model B.

<Comparison between Yield Displacement, Maximum Displacement, and Ductility Factor>

Figure 8A:
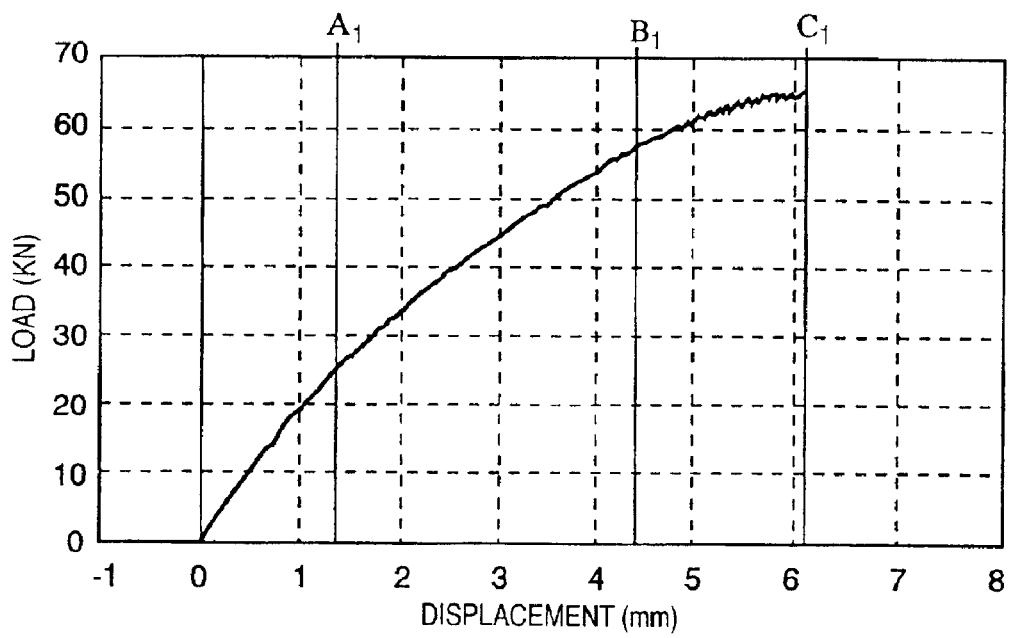
FIG. 8A is a graph showing a load-displacement curve obtained by a static loading test for a model A having no earthquake-proof reinforcement structure.
Figure 8B:
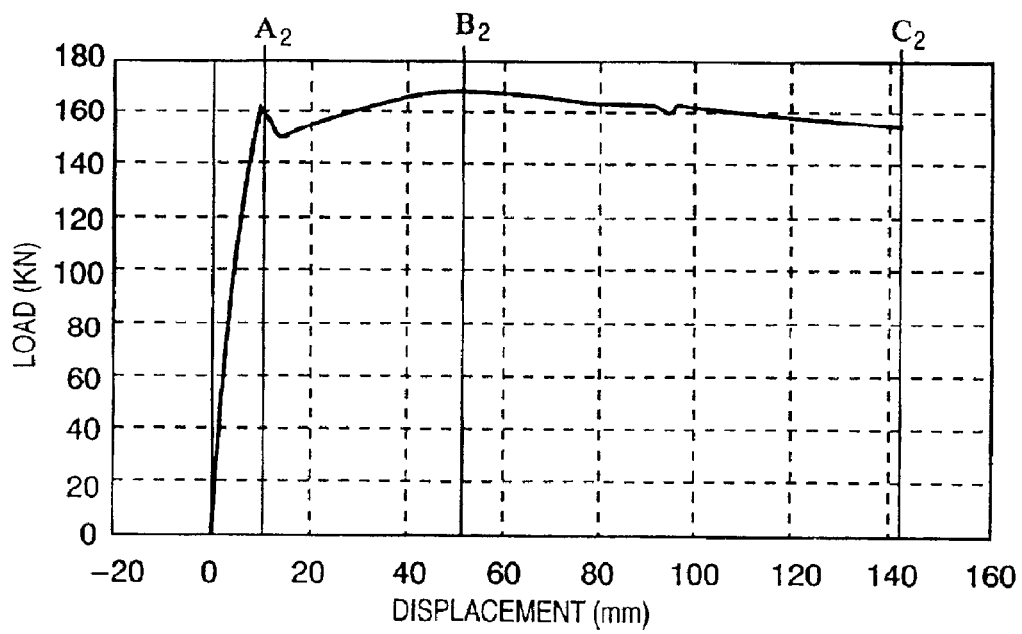
FIG. 8B is a graph showing a load-displacement curve obtained by a static loading test for a model B having an earthquake-proof reinforcement structure.

FIGS. 8A and 8B show load-displacement curves of the models A and B obtained by the static loading test. As is supposed by this test, in model A having no earthquake-proof reinforcement structure, stress on each member was gradually increased by the load, and the anchor bolts exceeded the yield point at a load of 25 (kN) (point $A_1$ in FIG. 8A) and entered a plastic region at a load of 58 (kN) (point $B_1$ in FIG. 8A). After that, as loading was continued, only strain increased, and the anchor bolts caused ductile fracture at a load of 67 (kN). This point is regarded as the collapse point of model A (point $C_1$ in FIG. 8A). It was confirmed that the ultimate strength of the pipe rack having no earthquake-proof reinforcement structure was determined by the strength of the anchor bolts.

On the other hand, in model B having an earthquake-proof reinforcement structure, it was confirmed that the members exceeded the yield point due to loading in the order of the compression-side braces and the beams and columns in the loading direction. The compression braces exceeded the plastic region at a load of 160 (kN) (point $A_2$ in FIG. 8B). After that, as loading was continued, only displacement increased, and the braces completely buckled at a load of 170 (kN). Since the strength of the anchor bolts was increased by concrete with pedestal foundation on the pedestal foundation (FIG. 4), and the columns and beams were reinforced by plates, the compression-side braces buckled first. The braces ruptured at a displacement of 142 (mm) (point $C_2$ in FIG. 8B). This is the collapse point of model B.

According to the curves shown in FIGS. 8A and 8B, the yield point is not conspicuous for model A (FIG. 8A) having no earthquake-proof reinforcement structure, though the yield point is conspicuous for the rack having the earthquake-proof reinforcement structure (FIG. 8B), i.e., the characteristic until the final rupture is obviously different from FIG. 8A.

FIG. 9 is a table showing the result of a static loading test, i.e., the comparison between the measurement results of the displacement (yield displacement $x_y$) until the rack structure yields and displacement (maximum displacement $x_u$) until the rack structure collapses and the ductility factor $\mu(=x_u/x_y)$ as the ratio of the yield displacement to the maximum displacement. Referring to FIG. 9, the ductility factor of model B having the earthquake-proof reinforcement structure is about three times that of the structure (model A) having no reinforcement structure (13.7/4.4=3.11). The ratio of ductility factors will be referred to as a "ductility factor ratio".

The ductility factor ratio of a structure having an earthquake-proof reinforcement structure means a deformation magnification, for a structure having no reinforcement structure, at which the structure can deform (including both the elastic region and plastic deformation region). That the ductility factor ratio increases to three times physically means that a three-times energy (the area of a portion surrounded by the load-displacement curve) is required until the structure is deformed by a load and collapses, i.e., the difficulty in collapse of the structure increases to three times.

FIGS. 8A and 8B show the displacements obtained by a static load. A displacement by a dynamically applied vibration is smaller than the displacement by the static loading test. This is because an eccentric moment acts on each member due to the dynamically applied vibration to generate a stress loss. Hence, in designing a rack, a static load is primarily taken into consideration.

As shown in FIGS. 4 and 5, in this embodiment, a damper portion 10 that forms a gap of about 10 to 15 mm is formed around the column member 2a, and the damper portion 10 is filled with a filler which has a high compression strength, expands/shrinks little, and can absorb stress due to bending deformation and, more specifically, an asphalt mastic molded strip plate (cushioning material) serving as a strip material for a concrete structure.

The filler is not limited to the above-described material, and any other material which elastically or plastically deforms can be used, such as various rubber materials including vibration isolating rubber, polymeric materials such as epoxy resin, metal materials such as an aluminum plate, aluminum alloy, and zinc plate, metal alloy materials, or materials such as asphalt containing petroleum or coal.

That is, any material capable of absorbing the bending moment of the steel column base when an external force acts can be used. A member having any structure or any shape can be used as long as it can greatly reduce the bending moment transmitted from the column base to the foundation by forming a gap between the concrete portion with pedestal foundation and the lower-side side surface of the column base instead of directly connecting them, filling the gap with a filler to reduce the interface bonding force between the concrete portion with pedestal foundation and the lower-side side surface of the column base, and allowing a bending deformation of the steel column base due to the action of an external force while absorbing most part of a bending moment in the steel column base by the filler and the concrete portion with pedestal foundation.

The concrete portion 12 with pedestal foundation (FIG. 4) having the damper portion 10 also functions to prevent the foundation 3 from being destroyed by stress transmitted from the column member 2a when the structure is not reinforced by the concrete with pedestal foundation. With this function, the stress transmitted from the column member 2a to the foundation 3 through the damper portion 10 and concrete portion 12 with pedestal foundation is eliminated. When the concrete portion 12 with pedestal foundation has this function, the stress transmitted to the foundation 3 decreases. Hence, the stress burdened by the foundation 3 decreases, and any destruction of the foundation 3 can be prevented.

<Design Analysis Method of Earthquake-Proof Reinforcement Structure Considering Plasticity>

The load-displacement characteristic of a rack obviously changes depending on the presence/absence of an earthquake-proof reinforcement structure (FIGS. 8A and 8B). The yield displacements and maximum displacements will be compared from the experimental data shown in FIG. 9. When no earthquake-proof reinforcement structure is formed, the yield displacement is 1.38 (mm). When an earthquake-proof reinforcement structure is formed, the yield displacement is 10.36 (mm). That is, the elastic range until yield increases to about 7.5 times (=10.36/1.38).

The maximum displacements after yield will be compared. When no earthquake-proof reinforcement structure is formed, the maximum displacement is 6.12 (mm). When an earthquake-proof reinforcement structure is formed, the maximum displacement is 142 (mm). The plastic deformation until the members rupture increases to about 23.2 times (=142/6.12). As described above, when an earthquake-proof reinforcement structure is formed, the elastic region and plastic deformation region widen.

In the design analysis method of the earthquake-proof reinforcement structure, an ultimate load that a rack whose earthquake-proof performance until rupture is improved by reinforcement can withstand is estimated, and a design load (use load) is calculated from the ultimate load.

In addition, the load is roughly calculated to obtain an allowable stress intensity ratio between a beam, column, brace, and the like, thereby determining whether the selected members are appropriate.

It is generally difficult to reflect the plastic deformation and load condition considering the ultimate rupture at the stage of design because of their nonlinear behaviors. In this embodiment, plastic deformation is approximated as a completely elasto-plastic model and regarded as equivalent to elastic deformation in which the energy stored in this deformation mode (the work done by the load and displacement) exhibits a linear behavior, and a load condition and displacement condition under which the energy becomes constant (the energy is stored) are used as constraint conditions for design.

A method of obtaining, in a design region widened to ultimate plasticity, the correlation between the allowable stress intensity ratio (σ/f) and the load factor (seismic intensity) for defining the load increase ratio to a yield load (load that gives the yield displacement), and selecting members (beams, columns, and braces) of a rack such that required design conditions are satisfied will be described below.

<Process of Earthquake-Proof Reinforcement Design>

Figure 11A:
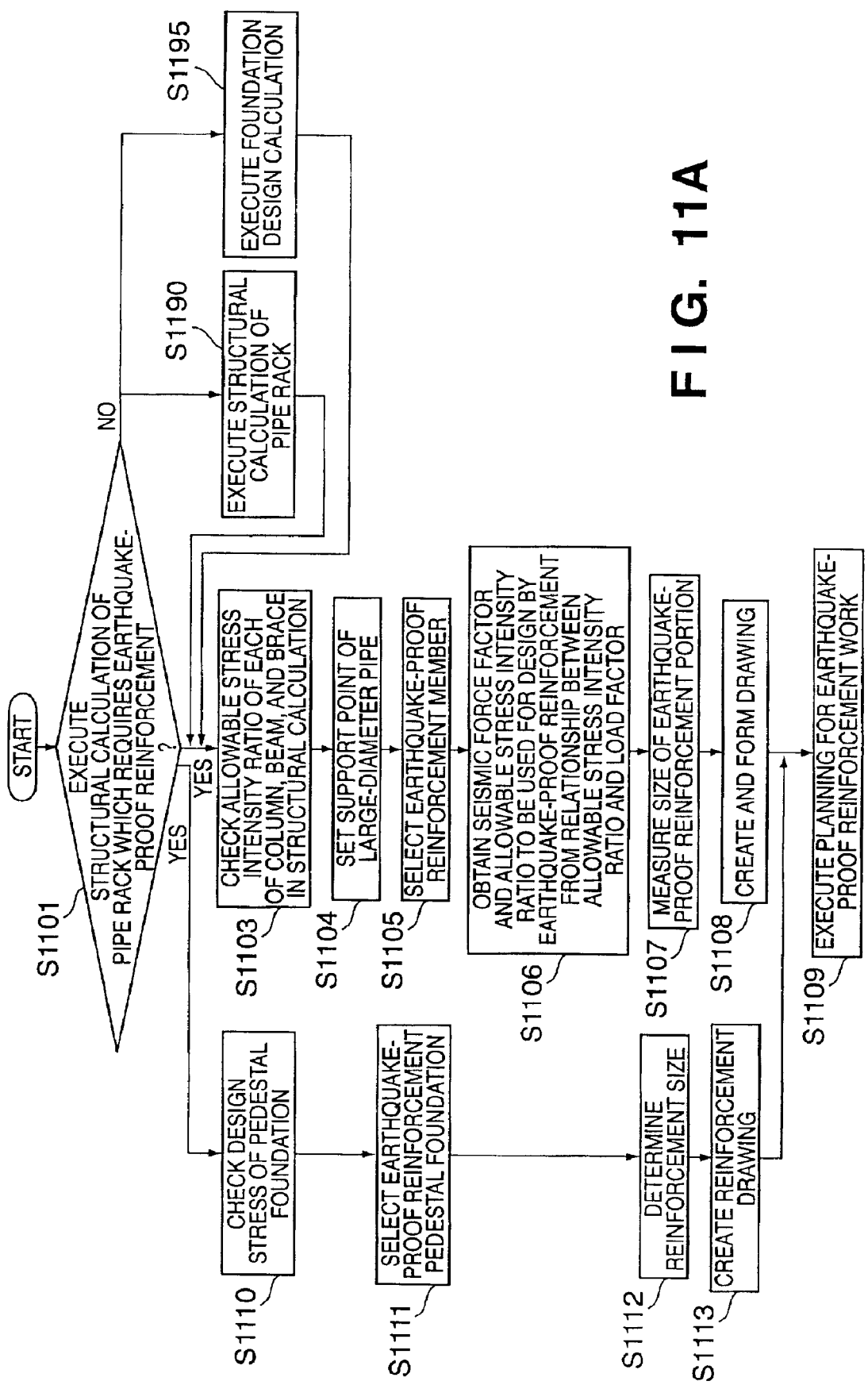
FIG. 11A is a flow chart for explaining the processing step of the earthquake-proof reinforcement method according to an embodiment of the present invention.

FIG. 11A is a flow chart for explaining the processing step of the earthquake-proof reinforcement method according to this embodiment.

<Step S1101>

In step S1101, it is determined whether structural calculation for a pipe rack has already been done.

If structural calculation is not executed (S1101—No), the processing advances to steps S1190 and S1195 to execute structural calculation for the pipe rack and design calculation for the rack foundation.

If structural calculation for the pipe rack has already been executed (S1101—Yes), the processing advances to step S1103.

Figure 10:
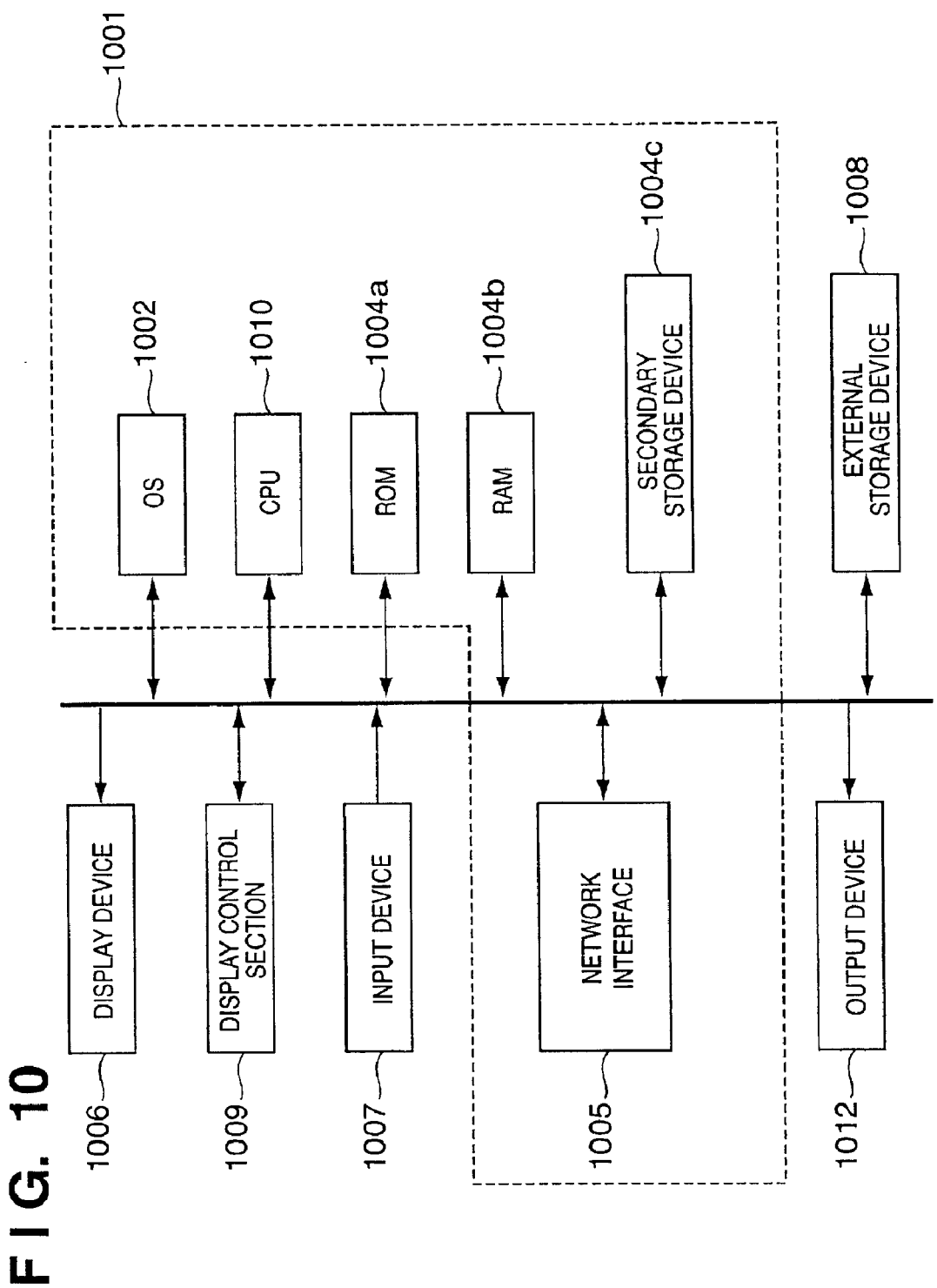
FIG. 10 is a block diagram showing the schematic arrangement of an information processing apparatus connected to a network.

FIG. 10 is a block diagram showing the schematic arrangement of an information processing apparatus connected to a network. Rack specification information related to the structural calculation for the pipe rack is input by an input device 1007 such as a keyboard or mouse and stored in a RAM 1004b and secondary storage device 1004c of the information processing apparatus. Mechanical arithmetic processing is executed by a CPU 1010 under the control of an OS 1002.

<Step S1103>

In step S1103, the allowable stress intensity ratio of the rack components (beams, columns, and braces) is checked from the analysis result based on the structural calculation. A member characteristic database stored in the secondary storage device 1004c of the information processing apparatus (FIG. 10) stores all pieces of unique information of the individual members, including the sectional shape, size, bending moment (M), shearing force (Q), buckling length (lb), allowable bending stress (fσ), allowable shearing stress (fs), and allowable stress intensity ratio (σ/f), as shown in FIG. 15. When the allowable stress intensity ratio is set to a predetermined range as the reference for member selection, and the database is looked up, members that fall within the set range of the allowable stress intensity ratio, e.g., $0.9 \leq \sigma/f \leq 1.0$ are picked up.

This result is displayed on a display device 1006 such as the display panel of the information processing apparatus. The designer can select or change the members on the basis of the displayed member information.

<Step S1104>

In step S1104, the support point of a large-diameter pipe to be supported by the pipe rack is input. When the load condition of the rack is taken into consideration for a beam member serving as the input support point, and the allowable stress intensity ratio decreases from the first set range to, e.g., $0.8 \leq \sigma/f \leq 1.0$, the member is selected as a member to be reinforced by an earthquake-proof reinforcement structure.

However, the range of the allowable stress intensity ratio for earthquake-proof reinforcement is not limited to the above range and can be arbitrary set.

<Step S1105>

In step S1105, on the basis of the results of structural calculation (steps S1190 and S1195), check of the allowable stress intensity ratio (S1103), and support point setting (S1104), members to be subjected to earthquake-proof reinforcement are finally selected.

<Step S1106>

In step S1106, earthquake-proof reinforcement design is executed for the members selected in step S1105. Which load factor and allowable stress intensity ratio are to be used for design by earthquake-proof reinforcement is determined from the relationship between the allowable stress intensity ratio and the load factor. Detailed processing is executed according to the flow chart shown in FIG. 11B. The detailed processing step of the earthquake-proof reinforcement design will be described with reference to the flow chart shown in FIG. 11B.

<Step S1201>

Figure 11B:
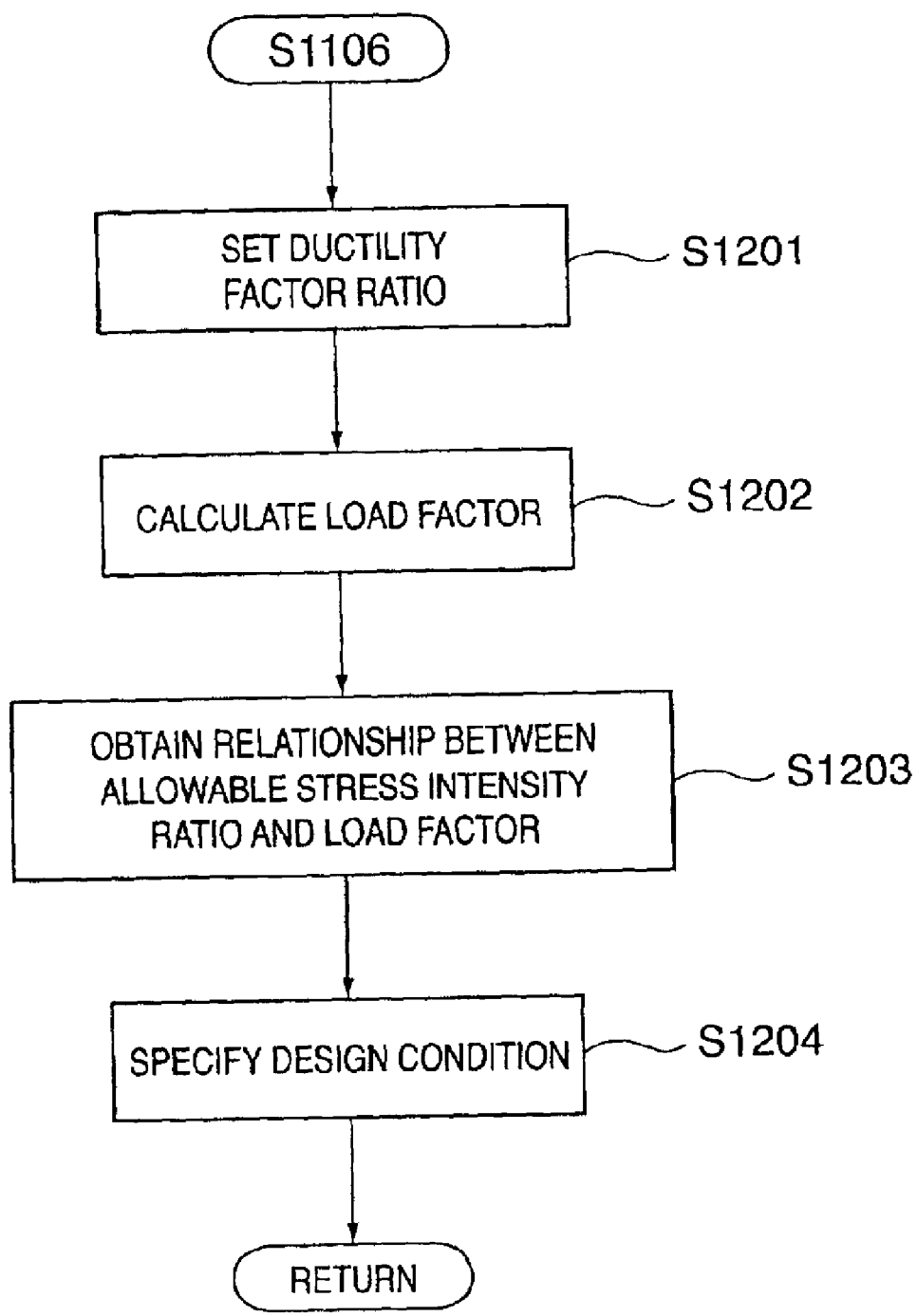
FIG. 11B is a flow chart for explaining the detailed processing step of the earthquake-proof reinforcement method according to the embodiment of the present invention.

In step S1201 of FIG. 11B, the ductility factor ratio for the pipe rack formed from the selected members is set. This parameter is defined by ductility factor ratio=(ductility factor of earthquake-proof reinforcement structure)/(ductility factor of structure having no earthquake-proof reinforcement structure).

The ductility factor ratio is one of important parameters used to calculate the safety factor for determining the margin for a design load, i.e., the load factor and determine the ultimate load in the plastic region. The relationship between the structural modulus and the ductility factor ratio will be described below.

<Structural Modulus and Ductility Factor Ratio>

The restoring force characteristic in a frame structure depends on the structure of members, the joint method for the member, and the load (P) and displacement. As for the amount of an accumulation plasticity deformation at the time of collapse of the frame structure (at the time of loss of the restoring force), in a completely elasto-plastic type (FIG. 12A), slip type (FIG. 12B), or vibration type having the composite restoring force characteristic of the completely elasto-plastic and slip types, since the positive and negative response values of accumulation plasticity deformation are almost equal, an absorbable plastic strain energy $_UW_P$ is given by $$_UW_P = 2Qy\delta B \quad (1)$$

where δB: layer displacement at the time of rupture

When the deformation capability of the frame structure is evaluated using a magnification η of an accumulation plasticity deformation, equation (1) is expressed by $$\eta = \delta B/\delta y \quad (2)$$

where δy: layer displacement at the time of yield

An actual pipe rack is an almost two-layered structure. For this reason, when the restoring force characteristic of each layer of the frame structure is replaced with the completely elasto-plastic deformation, an energy absorption amount $_UW_{P1}$ of the first layer until it collapses is given by $$_UW_{P1} = (Mg^2T^2/4\pi^2) \times 2c_1\alpha_1^2\eta_1 \quad (3)$$

where $C_1$: $1/\chi_1$ $\chi_1$: $\kappa_1/\kappa eq$ $\kappa eq$: $4\pi^2 M/T^2$ T: 1st-order eigen period $\kappa_1$: spring constant of the first layer $\alpha_1$: yield shearing force coefficient of the first layer Qy: yield strength of the first layer $\eta_1$: average magnification of accumulation plasticity deformation of the first layer The relationship between $_UW_{P1}$ and the total amount $_UW_P$ of the plastic strain energy that can be absorbed by the entire frame structure until the first layer of the pipe rack collapses is given by $$_UW_P = a_{1\,U}W_{P1} \quad (4)$$

Since $\alpha_1$ can be expressed as a function of the strength distribution, rigidity distribution, and mass distribution of each layer of the structure, the elastic vibration energy can be approximated by $$We = (Mg^2T^2/4\pi^2) \times (\alpha_1^2/2) \qquad (5)$$

Using equations (1) to (5), the yield shearing force coefficient $\alpha_1$ of the first layer at the time of collapse is obtained by $$\alpha_1 = 1/(1+4C_{11})^{(1/2)} \times 2\pi VD/gT \qquad (6)$$

where VD: velocity spectrum

Hence, a lower limit value Qun1 of the ultimate strength required of the first layer is given by $$Qun1 = \alpha_1 W \qquad (7)$$

where W: total weight of the structure = Mg

In accordance with the architectural standard of Japan, equation (7) can be rewritten as $$Qun1 = DsFesQud1 \qquad (8)$$

When $Qud1 = ZRtC_CW$ and $Fes = Z = 1.0$, from equations (7) and (8), we have $$\alpha_1 = DsRtC_C \qquad (9)$$

Equation (9) can be basically regarded as an acceleration response spectrum. The relationship between the acceleration response spectrum and a velocity response spectrum $V_D$ is given by $$RtC_Cg = (2\pi/T)V_D \qquad (10)$$

When equations (6) and (9) are compared on the basis of equation (10), a structural modulus Ds given by $$Ds = 1/(1+4C_{1\_1})^{(1/2)} \qquad (11)$$

is finally employed as the plasticity coefficient of the pipe rack.

Since the ductility factor ratio of a pipe rack is obtained as about 3.0 by an earthquake-proof test, this value may be employed as a deformation magnification in the calculation. Alternatively, an arbitrary constant may be set as the ductility factor ratio.

As described in the embodiment of the present invention, the earthquake-proof reinforcement method using a damper member for the column member foundation gives a structural characteristic for widening the elastic region and plastic deformation range, and earthquake-proof performance. Hence, the region of material selection and design load can be widened as compared to the prior art.

<Step S1202>

In step S1202 of FIG. 11B, on the basis of the ductility factor ratio set in step S1201, a load factor for plastic design considering the ultimate load of the pipe rack is calculated on the basis of equation (11).

The ductility factor ratio of the rack is obtained as about 3.0 by the earthquake-proof test. When this numerical value is substituted into equation (11), the structural modulus Ds is $$Ds = 0.33 \qquad (12)$$

The numerical value of equation (12) is an appropriate value that falls within the allowable range of the structural modulus defined by the architectural standard of Japan, which is given by $$Ds = 0.3 \text{ to } 0.55 \qquad (13)$$

A structural modulus is a numerical value determined by the shape of a structure in calculating the possession strength of the structure. A possession strength is designed to prevent any collapse of a structure even when the members of the structure exceed the yield point stress, as in a design considering the ultimate strength. Hence, a load factor Ce for plastic design of the rack is about 1.3 (=1.0+structural modulus Ds 0.33), that is, $$Ce \approx 1.3 \qquad (14)$$

The value Ce has a meaning as a safety factor for the design load. A load obtained by multiplying the design load by the safety factor is the ultimate load.

<Step S1203>

In step S1203, processing of obtaining the relationship between the load factor (seismic intensity) and the allowable stress intensity ratio ($\sigma/f$) is executed. This relationship is obtained on the assumption of modeling in which the relationship between the load and the plastic deformation when plastic deformation occurs in the rack structure is approximated as a so-called completely elasto-plastic model, and the energy until collapse (work which is performed by the load and displacement) almost equals the restoring force (energy) when the behavior of the rack is replaced as an elastic member.

Figure 13A:
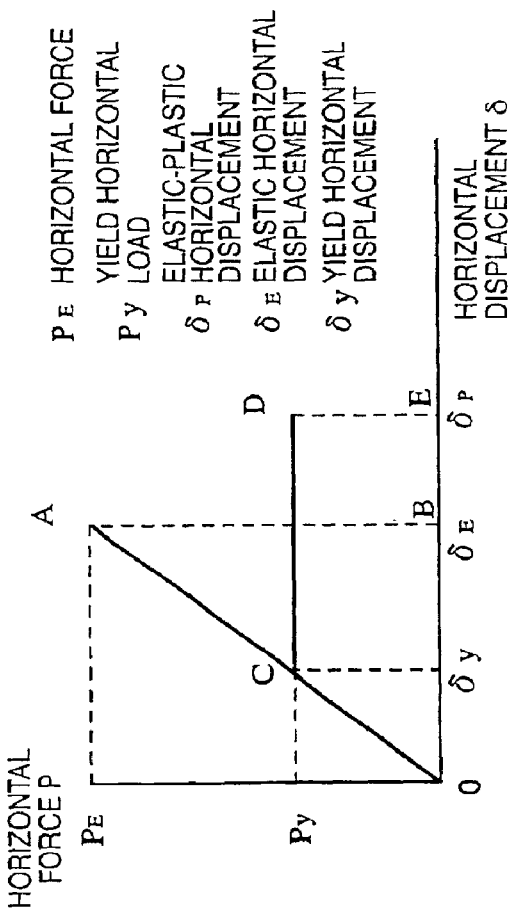
FIG. 13A is a view showing a horizontal displacement (δ) generated when a horizontal load (P) acts on a structure.
Figure 13B:
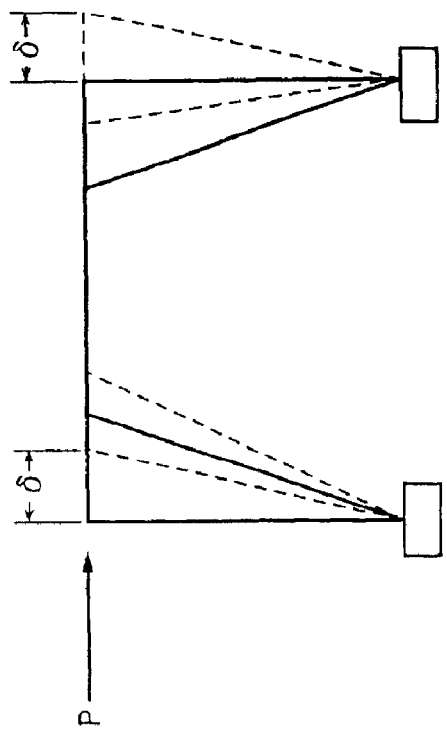
FIG. 13B is a view for explaining a relationship with which the elastic energy and elasto-plastic energy are stored (the area of an elastic restoring force Δ OAB equals that of an elasto-plastic restoring force □ OCDE)

That is, when a horizontal load acts on a structure (FIG. 13A), the relationship between the horizontal force X and the horizontal displacement $\delta$ at that position can be simplified as shown in FIG. 13B in which the area of an elastic restoring force $\triangle OAB$ equals that of an elasto-plastic restoring force $\square OCDE$. The elasto-plastic restoring force characteristic obtained by the earthquake-proof test corresponds to the OCD curve shown in FIG. 13B.

In the definition of the architectural standard of Japan, (1) in calculating the section of each member, the allowable stress intensity ratio ($\sigma/f$) must be smaller than 1.0, and (2) although the ductility factor ratio is large, the allowable stress intensity ratio never reaches larger than 1.0, e.g., 1.3.

The plastic design is to examine whether a structure is safe against the ultimate load, and the ultimate load is obtained by multiplying an acting load by the load factor. That is, design is executed such that an ultimate load is set by multiplying the design load (acting load) used for allowable stress intensity ratio design by the load factor (safety factor), and the magnitude of the load equals the load (collapse load) of collapse by the main frame structure.

Figure 14:
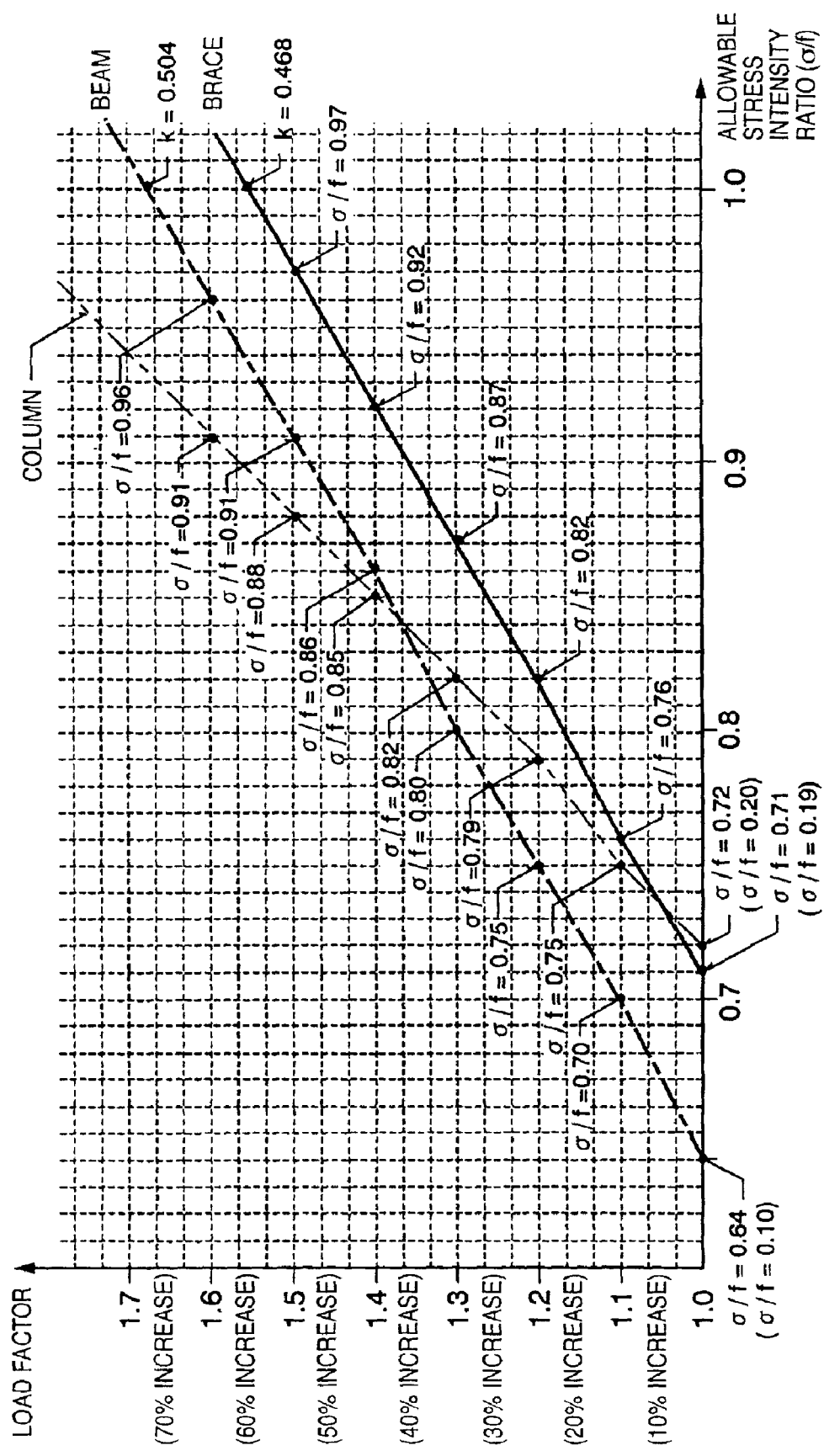
FIG. 14 is a graph for explaining the relationship between a load factor and an allowable stress intensity ratio to a selected member.

In step S1203, the relationship between the allowable stress intensity ratio and the load factor is obtained for each of the selected members, as shown in FIG. 14.

An increase in load, which corresponds to a multiple of the load factor for the design load (acting load), is caused because a yield horizontal load $P_y$ which makes the displacement (strain) progress in the plastic region is replaced with a load which makes the elastic deformation progress as a load that increases from a point C ($P_y, \delta_y$) to a point A ($P_E, \delta^E$) in FIG. 13B. When the allowable stress intensity is calculated for the increased in load, an allowable stress intensity ratio corresponding to the load factor can be obtained.

Since the ductility factor ratio is improved by the earthquake-proof reinforcement, the range of elastic deformation and the range of plastic deformation broaden. Hence, the design enable range also exceeds the elastic range (yield point), and the increase in load in the plastic range and the allowable stress intensity ratio corresponding to the increase in load.

However, for the increase in load, the architectural standard of Japan stipulates that the allowable stress intensity ratio may not exceed 1.0, as already described above.

As an effect of the earthquake-proof reinforcement, the design enable region widens. If a load factor corresponding to the maximum value (upper limit value) 1.0 of the allowable stress intensity ratio for a selected member is known, the load factor can be specified as the ultimate load at which the member breaks. Limit design that utilizes the design enable region at maximum becomes possible.

<Step S1204>

In step S1204, on the basis of the relationship between the load factor and the allowable stress intensity ratio obtained in step S1203 (FIG. 14), the design load is determined, and whether each selected member is appropriate is determined.

(1) With reference to the upper limit value 1.0 of the allowable stress intensity ratio of a selected member, a load factor corresponding to it is specified. When the ultimate load is specified, the design load can be obtained, and whether a load condition acting on a pipe support point and the like are appropriate can be determined.

For example, the brace member in FIG. 14 will be examined. The load factor that gives the allowable stress intensity ratio of 1.0 is about 1.57. In this case, the load increases by about 57% for the reference load factor of 1.0 (design load). When a larger load is applied, the brace member collapses (buckles). A load obtained by multiplying the design load (acting load) by the safety factor is the ultimate load. Hence, when the load factor (safety factor) can be obtained, the allowable design load can be quantitatively grasped.

The allowable stress intensity ratio of the beam member for the load factor of 1.57 is 0.94 from the relationship shown in FIG. 14. Similarly, the allowable stress intensity ratio of the column member is 0.9. Both allowable stress intensity ratios are smaller than 1.0 and have margins.

On the other hand, a load factor at which the allowable stress intensity ratio of the beam member becomes 1.0 is about 1.68. For the column member, even when the load factor exceeds 1.70, the allowable stress intensity ratio is still smaller than 1.0 and has a margin.

In the pipe rack including beams, columns, and braces as members, even when the braces buckle at a load corresponding to a load factor of 1.57, the column members do not reach the ultimate load yet, and the rack structure is still strong.

Of the ultimate loads specified for the plurality of types of members of the pipe rack, the minimum value is specified as the ultimate load of the structure.

However, if the ultimate loads of the main members of the pipe rack are larger than the ultimate load of a reinforcing element such as a brace member, the minimum ultimate load of the main members is specified as the ultimate load of the rack structure.

(2) Conversely, whether a selected member falls within the range of a predetermined allowable stress intensity ratio (σ/f) can be determined with reference to the load factor.

For example, the column member shown in FIG. 14 will be examined. When the load factor is 1.5 (increase in load is 50%), the allowable stress intensity ratio (σ/f) of the column member is 0.88. That is, even when an increase in load is estimated as 50%, the allowable stress intensity ratio of the column member is smaller than 1.0 (upper limit value) and has a margin. If the value of 0.88 falls within the range of the allowable stress intensity ratio given as the degree of freedom of design, this column member satisfies the design condition.

If a member is not appropriate for the design condition, the processing returns to steps S1103 and 1104 to select members and re-set conditions such as the load condition (S1103 and S1104).

When the ultimate load is specified, and whether each selected material is appropriate is determined, as described above, the processing advances to step S1107 in FIG. 11A.

<Step S1107>

In step S1107 of FIG. 11A, variation information of each member, such as a tilt or curve of each earthquake-proof reinforcement member, is measured, and the result is processed.

<Step S1108>

In step S1108, drawings of the pipe rack are created.

<Step S1109>

In step S1109, planning processing for the work of the earthquake-proof reinforcement is executed.

<Steps S1110 and S1111>

In step S1110, the design stress that is generated in the foundation is checked in accordance with foundation design calculation (step S1195). In step S1111, a foundation in which a predetermined stress is generated is selected as an earthquake-proof reinforcement target.

<Step S1112>

In step S1112, the earthquake-proof reinforcement for the foundation portion selected in step S1111 is designed. As an earthquake-proof reinforcement method, the size of a reinforcing member for the method described with reference to FIGS. 4 and 5 is determined.

As the design analysis method, a member having any structure or any shape can be used as long as it can greatly reduce the bending moment transmitted from the column base to the foundation by forming a gap between the concrete portion with pedestal foundation and the column base instead of directly connecting them, filling the gap with a filler to reduce the interface bonding force between the concrete portion with pedestal foundation and the lower-side side surface of the column base, and allowing a bending deformation of the steel column base due to the action of an external force while absorbing most part of a bending moment in the steel column base by the filler and the concrete portion with pedestal foundation.

The material of the filler is not limited to vibration isolating rubber, and any other material which elastically or plastically deforms can be used, such as various rubber materials, polymeric materials such as epoxy resin, metal materials such as an aluminum plate, aluminum alloy, and zinc plate, metal alloy materials, or materials such as asphalt containing petroleum or coal. That is, a material which can absorb the bending moment of the steel column base when an external force acts can be used.

The gap may be left as a space instead of filling it with a filler. In this case, the effect for absorbing the bending moment of the steel column base when an external force acts in the space portion of the gap decreases. However, as compared to the case wherein the gap is filled with a filler, the allowable range of the bending deformation of the steel column base, which is generated in accordance with action of an external force, can be widened using the space portion of the gap. As a result, the bending moment generated in the steel column base and transmitted from the column base to the foundation is reduced by the space portion of the gap. With the above-described two effects, the same effect as in the case wherein the gap is filled with a filler can be expected even when the gap is left as a space.

<Step S1113>

In step S1113, drawing generation processing for the reinforcement design that is done in step S1112 is executed.

The processing of the flow charts shown in FIGS. 11A and 11B is executed by the CPU 1010 under the control of the OS 1002 in the information processing apparatus shown in FIG. 10. The member characteristic database looked up in checking the allowable stress intensity ratio of each member (step S1103) may be stored in the secondary storage device 1004c such as the hard disk in an information processing apparatus 1001 or a ROM 1004a. Alternatively, data may be transmitted/received to/from another information processing apparatus connected to the network (1005), and appropriately updated data may be used.

In this embodiment, the true strength of a pipe rack can be obtained in accordance with a quantitatively obtained ductility factor ratio, and the degree of an external force that can be covered can be clarified. When earthquake-proof design is done using the ductility factor ratio, optimum members can be selected.

The object of the present invention can also be achieved by supplying a storage medium which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the new function of the present invention by themselves, and the storage medium which stores the program codes constitutes the present invention. As the storage medium for supplying the program codes, for example, a floppy disk, hard disk, optical disk, magnetooptical disk, DVD, CD-ROM, magnetic tape, nonvolatile memory card, ROM, EEPROM, or the like can be used.

The functions of the above-described embodiment are implemented not only when the readout program codes are executed by the computer but also when the operating system (OS) running on the computer performs part or all of actual processing on the basis of the instructions of the program codes. The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As described above, according to the earthquake-proof reinforcement using a concrete with pedestal foundation for a column member standing on a foundation member, a damper portion is provided between the base and the concrete member with pedestal foundation. Since a bending moment generated in the base by an external force can be reduced by the damper portion such that it is hardly transmitted to the foundation, the bending moment that the foundation member takes a share can be reduced. Hence, as compared to a structure before earthquake-proof reinforcement, the ductility factor ratio can be improved, and the design enable region can be widened by broadening the elastic range and plastic deformation range of the member.

In the design analysis method of an earthquake-proof reinforcement structure using earthquake-proof reinforcement, the ultimate load of a pipe rack can be specified from the relationship between the load factor and the allowable stress intensity ratio.

When earthquake-proof design is done using the ductility factor ratio, members can be selected in accordance with the earthquake-proof capability.

As many apparently widely different embodiments of the present invention can be made without departing from the spirit and scope thereof, it is to be understood that the invention is not limited to the specific embodiments thereof except as defined in the appended claims.

What is claimed is:

1. A design analysis method of an earthquake-proof reinforcement structure, comprising:
   the selection step of selecting a member of the earthquake-proof reinforcement structure with reference to an allowable stress intensity ratio of the member;
   the ductility factor ratio setting step of setting a ductility factor ratio allowable as a deformation magnification by earthquake-proof reinforcement of the selected member;
   the load factor calculation step of calculating an increase in load in a plasticity range, which acts on the selected member, on the basis of the set ductility factor ratio;
   the calculation step of calculating an allowable stress intensity ratio corresponding to the increase in load in the plasticity range; and
   the specifying step of, when the calculated allowable stress intensity ratio is defined as a maximum value, specifying the corresponding increase in load in the plasticity range as an ultimate load at which the selected member collapses.

2. The analysis according to claim 1, wherein the maximum value of the allowable stress intensity ratio is 1.0.

3. The analysis according to claim 1, wherein the ductility factor ratio in earthquake-proof reinforcement having a damper portion arranged between a base of a column member and a reinforcing member using concrete with pedestal foundation in the earthquake-proof reinforcement structure is not less than 3.0.

4. The analysis method according to claim 1, wherein in the selection step, a load of an object supported by the earthquake-proof reinforcement structure is used as a condition for member selection.

5. The analysis method according to claim 1, wherein in the specifying step, for an earthquake-proof reinforcement structure formed from a plurality of types of members, ultimate loads specified for the respective members are compared, and a minimum ultimate load of the ultimate loads is specified as the ultimate load of the earthquake-proof reinforcement structure.

6. The analysis method according to claim 1, wherein in the specifying step, for an earthquake-proof reinforcement structure formed from a main member and a reinforcing member for reinforcing the main member, ultimate loads specified for the respective members are compared, and when the ultimate load of the main member is larger than that of the reinforcing member, the ultimate load of the main member is specified as the ultimate load of the earthquake-proof reinforcement structure.

7. The analysis method according to claim 6, wherein the main member comprises a beam or column member, and the reinforcing member comprises a brace member.

8. A storage medium which stores a program module for causing a computer to execute a design analysis method of an earthquake-proof reinforcement structure, comprising:
   a selection module for selecting a member of the earthquake-proof reinforcement structure with reference to an allowable stress intensity ratio of the member;
   a ductility factor ratio setting module for setting a ductility factor ratio allowable as a deformation magnification by earthquake-proof reinforcement of the selected member;

a load factor calculation module for calculating an increase in load in a plasticity range, which acts on the selected member, on the basis of the set ductility factor ratio;

a calculation module for calculating an allowable stress intensity ratio corresponding to the increase in load in the plasticity range; and a specifying step for, when the calculated allowable stress intensity ratio is defined as a maximum value, specifying the corresponding increase in load in the plasticity range as an ultimate load at which the selected member collapses.

9. The medium according to claim 8, wherein the maximum value of the allowable stress intensity ratio is 1.0.

10. The medium according to claim 8, wherein the ductility factor ratio in earthquake-proof reinforcement having a damper portion arranged between a base of a column member and a reinforcing member using concrete with pedestal foundation in the earthquake-proof reinforcement structure is not less than 3.0.

11. The medium according to claim 8, wherein in the selection module, selection processing of the member is executed using a load of an object supported by the earthquake-proof reinforcement structure as a condition for member selection.

12. The medium according to claim 8, wherein in the specifying module, for an earthquake-proof reinforcement structure formed from a plurality of types of members, ultimate loads specified for the respective members are compared, and a minimum ultimate load of the ultimate loads is specified as the ultimate load of the earthquake-proof reinforcement structure.

13. The medium according to claim 8, wherein in the specifying module, for an earthquake-proof reinforcement structure formed from a main member and a reinforcing member for reinforcing the main member, ultimate loads specified for the respective members are compared, and when the ultimate load of the main member is larger than that of the reinforcing member, the ultimate load of the main member is specified as the ultimate load of the earthquake-proof reinforcement structure.

14. A design analysis method of an earthquake-proof reinforcement structure, comprising the steps of:

designing selected members on the basis of an ultimate load specified by a design analysis method; and designing earthquake-proof reinforcement by providing a damper portion between a base of a column member of the designed selected members and a reinforcing member using concrete with pedestal foundation, which reinforces the base, wherein the design analysis method of specifying the ultimate load comprises:

the selection step of selecting a member of the earthquake-proof reinforcement structure with reference to an allowable stress intensity ratio of the member;

the ductility factor ratio setting step of setting a ductility factor ratio allowable as a deformation magnification by earthquake-proof reinforcement of the selected member;

the load factor calculation step of calculating an increase in load in a plasticity range, which acts on the selected member, on the basis of the set ductility factor ratio;

the calculation step of calculating an allowable stress intensity ratio corresponding to the increase in load in the plasticity range; and the specifying step of, when the calculated allowable stress intensity ratio is defined as a maximum value, specifying the corresponding increase in load in the plasticity range as an ultimate load at which the selected member collapses.

* * * * *